United States Patent
Chih

[19]
[11] Patent Number: 6,062,537
[45] Date of Patent: May 16, 2000

[54] FAST PIPE JOINT

[76] Inventor: Chen-Chien Chih, 7F-2, No. 5, Fu An St., Fu An Li, Taichung, Taiwan

[21] Appl. No.: 09/036,552

[22] Filed: Mar. 6, 1998

[51] Int. Cl.[7] ..................................................... F16L 37/28
[52] U.S. Cl. ................. 251/149.6; 251/152; 251/149.1; 251/148; 137/329.2
[58] Field of Search ............................. 251/149.1, 149.6; 137/329.2; 231/148, 152; 285/39, 38, 177, 238, 244, 322, 23, 97, 93, 21.1, 328

[56] References Cited

U.S. PATENT DOCUMENTS

| | | | |
|---|---|---|---|
| 2,179,460 | 6/1939 | White | 251/148 |
| 3,635,502 | 1/1972 | Burkhalter, Jr. | 285/177 |
| 4,093,279 | 6/1978 | Verdesca et al. | 285/39 |
| 4,629,220 | 12/1986 | Crusco | 285/238 |
| 4,655,486 | 4/1987 | Tarnay et al. | 285/38 |
| 4,699,404 | 10/1987 | Drevs | 285/244 |
| 4,703,958 | 11/1987 | Fremy | 251/149.6 |
| 5,213,375 | 5/1993 | Wu | 285/38 |
| 5,284,369 | 2/1994 | Kitamura | 285/322 |
| 5,286,066 | 2/1994 | Yang | 285/23 |
| 5,290,072 | 3/1994 | Pechacek | 285/97 |
| 5,297,819 | 3/1994 | Harder | 285/93 |
| 5,320,326 | 6/1994 | Ju et al. | 251/149.6 |
| 5,338,071 | 8/1994 | Hohmann et al. | 285/322 |
| 5,403,043 | 4/1995 | Smet | 285/39 |
| 5,462,255 | 10/1995 | Rosen et al. | 251/149.1 |
| 5,467,806 | 11/1995 | Stricklin et al. | 251/149.6 |
| 5,636,875 | 6/1997 | Wasser | 285/21.1 |
| 5,692,785 | 12/1997 | Wartluft et al. | 285/328 |
| 5,911,404 | 6/1999 | Cheng | 137/329.2 |

*Primary Examiner*—A. Michael Chambers
*Assistant Examiner*—Thomas L. McShane
*Attorney, Agent, or Firm*—W. Wayne Liauh

[57] ABSTRACT

A fast pipe joint is composed of a sleeve and a main body. The sleeve is fitted over the main body such that an elastic piece extending upward from lower end of the inner edge of the sleeve is engaged with a retaining hole of the main body. The retaining hole is located in the channel of the main body. The main body is provided at the lower end thereof with a tubular body. The retaining portion of the elastic piece is engaged with the top of the retaining hole such that the inner edge of the retaining hole is urged by the retaining portion, so as to press against the tubular body located in the channel. When the sleeve is exerted on by a downward force, the sleeve is actuated to move downward, so as to enable the retaining portion to be retained in the bottom of the retaining hole to move out. The structure is thus simple and cost-effective. The structure can be quickly fastened or unfastened with the tubular body.

11 Claims, 12 Drawing Sheets

FAST PIPE JOINT

FIELD OF THE INVENTION

The present invention relates generally to a pipe joint, and more particularly to a fast pipe joint which is simple in construction and cost-effective.

BACKGROUND OF THE INVENTION

Figure 1:
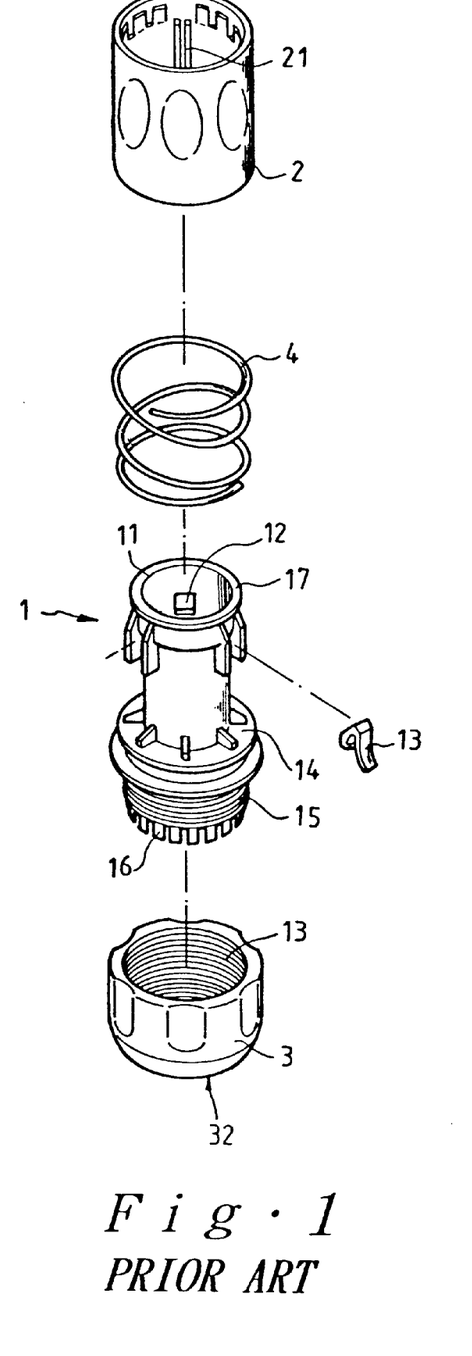
FIG. 1 shows an exploded view of a prior art fast joint.
Figure 2:
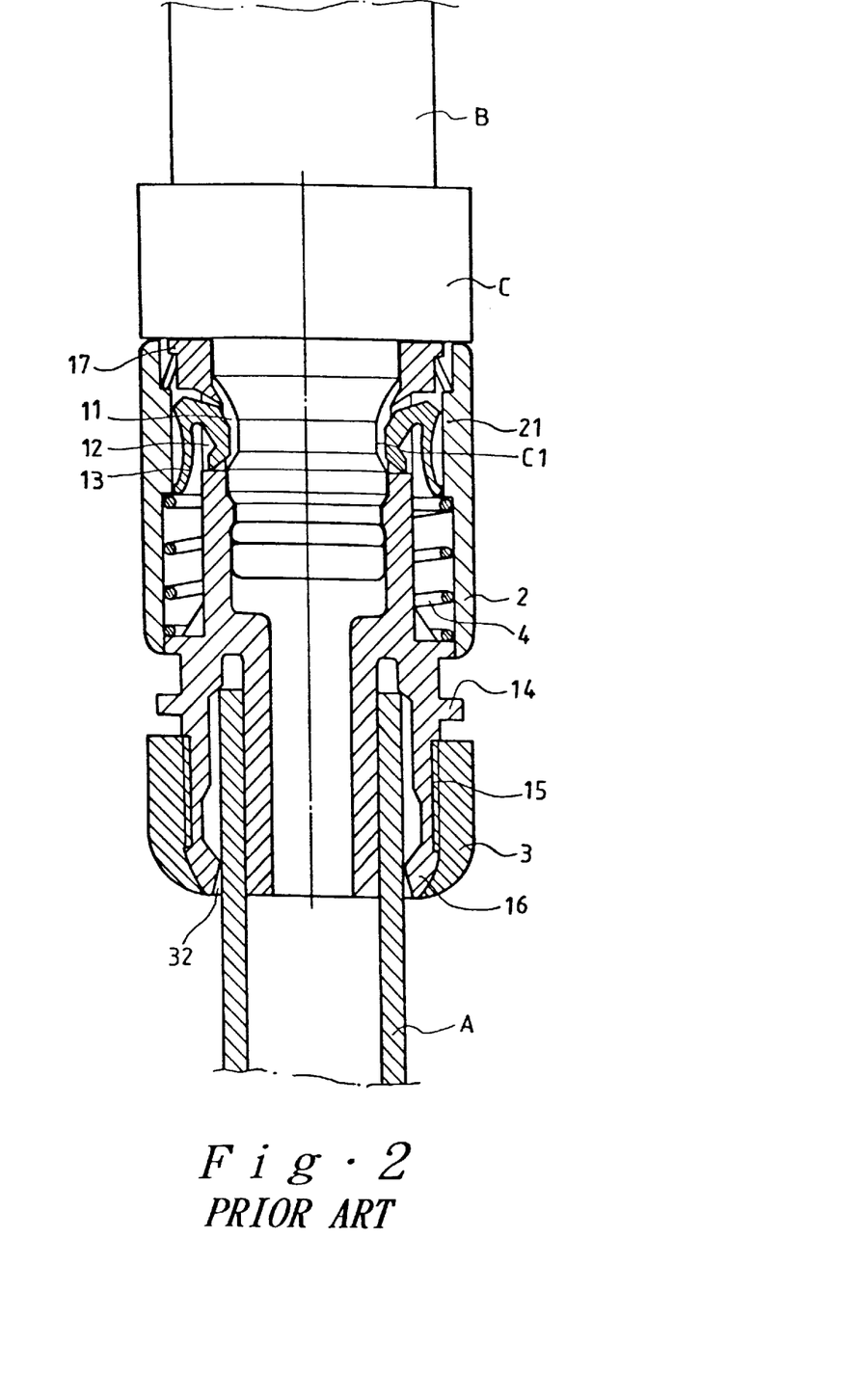
FIG. 2 shows a longitudinal sectional view of the prior art fastjoint in combination.

As shown in FIG. 1, a prior art fast joint is composed of a main body 1, a sleeve 2, a rotary body 3, and a spring 4. The main body 1 is provided with a channel 11 and three guide grooves 12 located in the wall of the main body 1 such that the guide grooves 12 are in communication with the channel 11. The main body 1 is further provided with a stopping ring 14 located under the guide grooves 12, an outer threaded portion 15 located under the stopping ring 14, and a connection portion 16 extending from the outer threaded portion 15. The spring 4 is fitted over the main body 1 such that one end of the spring 4 is located in the channel 11. The sleeve 2 is engaged with the main body 1 such that the sleeve 2 is stopped by a protruded edge 17 and the stopping ring 14 of the main body 1. The sleeve 2 is provided in the inner wall thereof with a rib 21 corresponding in location to an elastic piece 13. The rotary body 3 is provided with a female threaded portion 31 which is engaged with the male threaded portion 15 of the main body 1. The rotary body 3 is provided in the bottom end thereof with an opening 32.

Such a prior art fast joint as described above is defective in design in that the main body, the sleeve, the spring and the rotary body must be made separately by the separate molding tools, thereby resulting in a substantial increase in the cost of producing the prior art fast joint. In addition, it is difficult to carry out an effective quality control of the component parts of the prior art fast joint. Moreover, the component parts, such as the spring, of the prior art fast joint are vulnerable to wear or fatigue, thereby undermining the function of the prior art fast joint.

SUMMARY OF THE INVENTION

The primary objective of the present invention is to provide a fast joint free from the shortcomings of the prior art fast joint.

Another objective of the present invention is to provide a fast pipe joint consisting of a main body having a channel in which a movable valve is disposed. By means of the action of the movable valve, the water flow is stopped at the time when the tubular body is removed from the main body.

The foregoing objectives and advantages of the present invention will be more readily understood upon a thoughtful deliberation of the following detailed description of the present invention with reference to the accompanying drawings.

DETAILED DESCRIPTION OF THE EMBODIMENT

Figure 3:
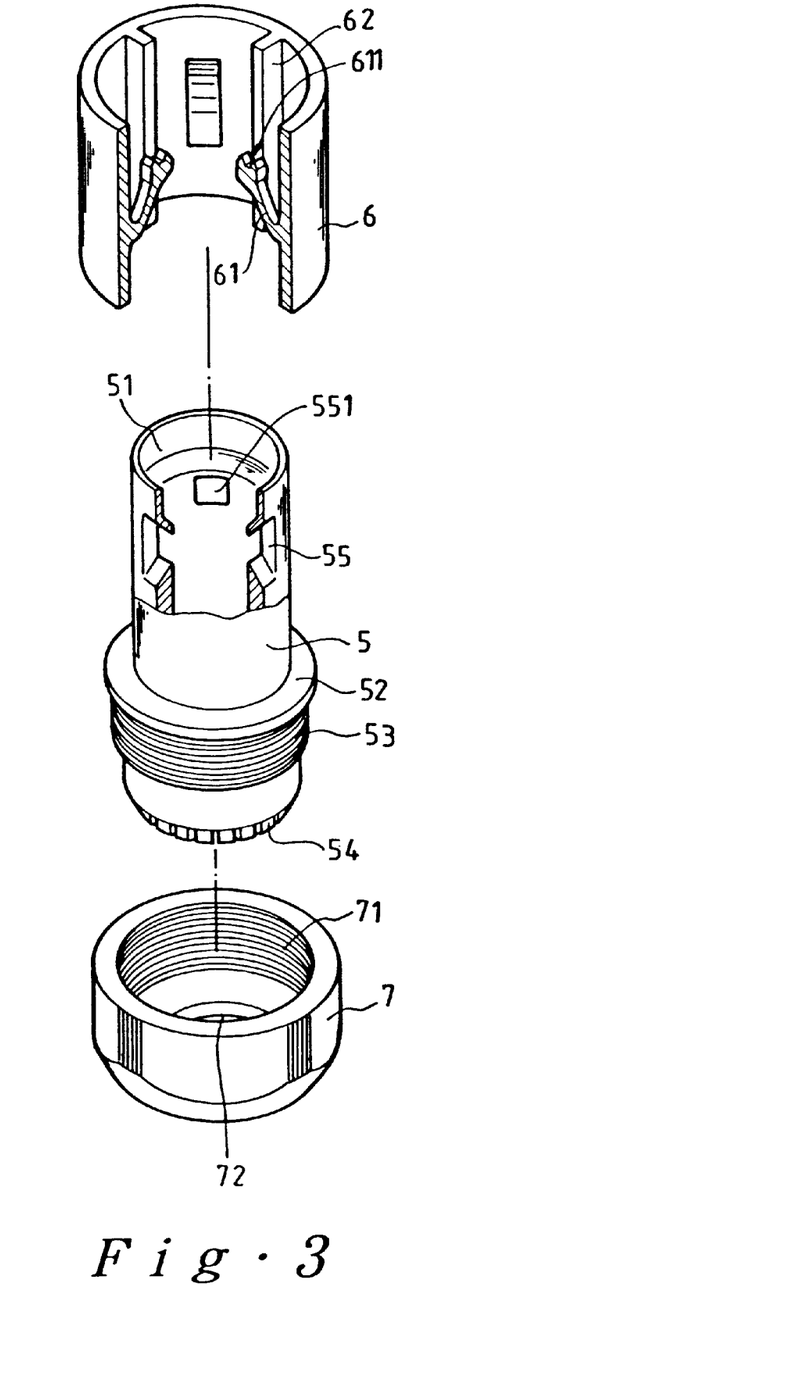
FIG. 3 Shows an exploded view of a first preferred embodiment of the present invention.
Figure 4:
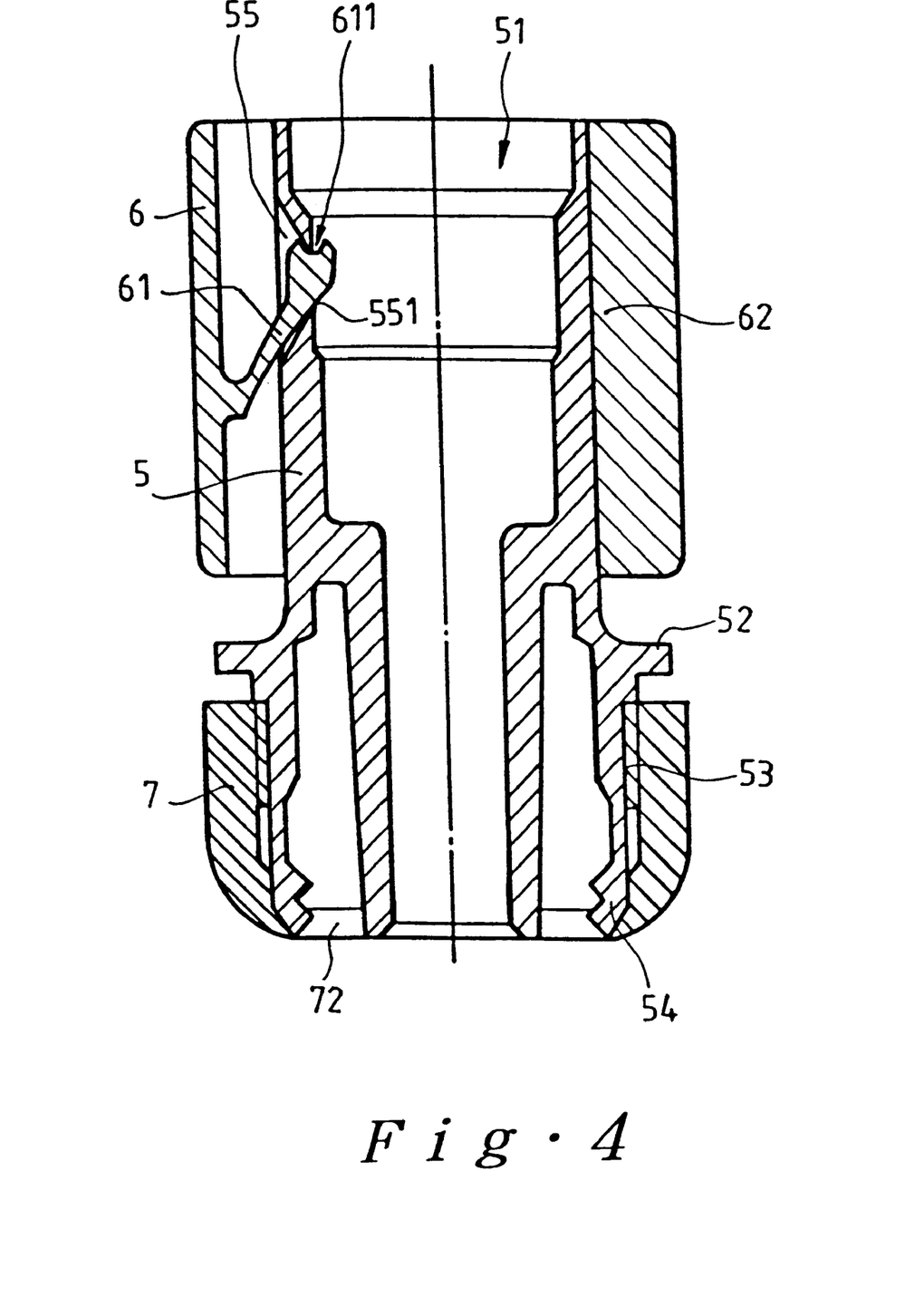
FIG. 4 Shows a sectional schematic view of the first preferred embodiment of the present invention in combination.

As shown in FIGS. 3 and 4, a fast pipe joint embodied in the present invention is composed of a main body 5, a sleeve 6, and a rotary body 7.

The main body 5 is provided with a channel 51 extending along the direction of the longitudinal axis of the main body 5, an arresting edge 52, a male threaded portion 53 located next to the arresting edge 52, and a connection portion 54 contiguous to the male threaded portion 53. The main body 5 is further provided in the wall of the channel 51 thereof with a retaining hole 551 and is still further provided in the wall thereof with three indentations 55, which are arranged equidistantly.

The sleeve 6 is fitted over the main body 5 and is provided in the inner wall thereof with two elastic pieces 61 each having a retaining portion 611, which is engageable with the retaining hole 551 of the main body 5. Located between the two elastic pieces 611 is a locating rib 62.

The rotary body 7 is provided with a female threaded portion 71 and an opening 72 located at the bottom end thereof. The main body 5 and the rotary body 7 are joined together such that the male threaded portion 53 of the main body 5 is engaged with the female threaded portion 71 of the rotary body 7, and that the connection portion 54 of the main body 5 is located in the opening 72 of the rotary body 7.

Figure 5:
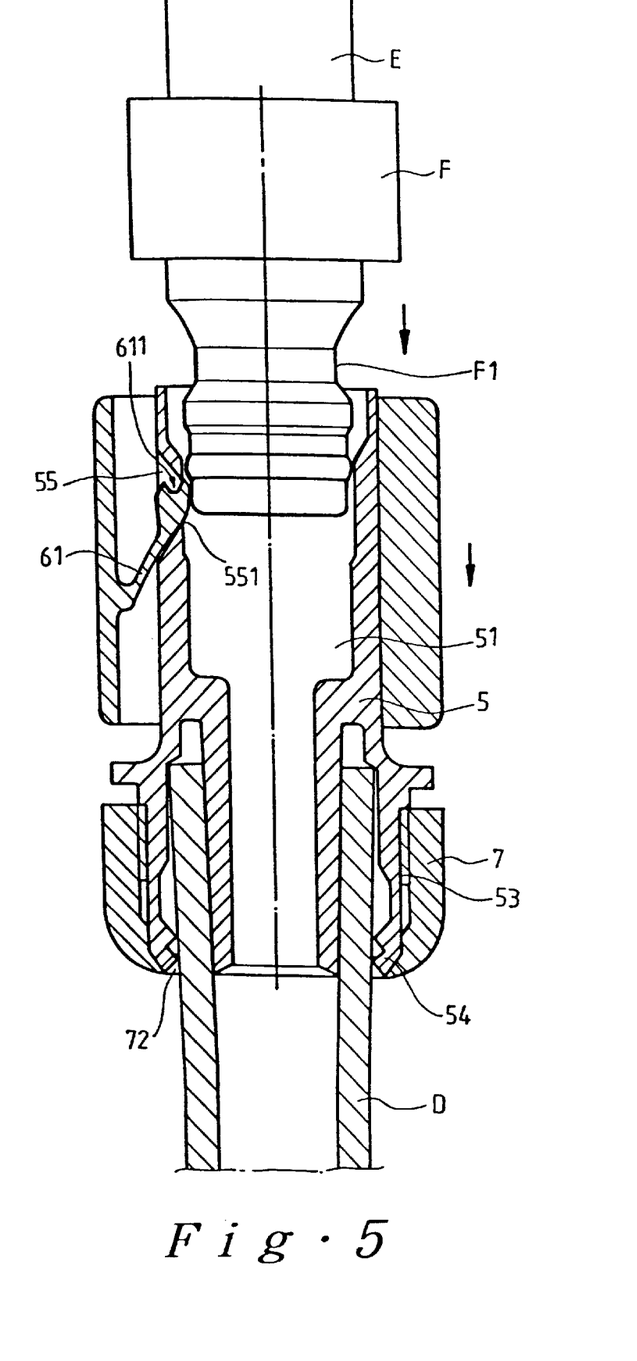
FIG. 5 Shows a schematic view illustrating the action by which the first preferred embodiment and the tubular body of the present invention are engaged.
Figure 6:
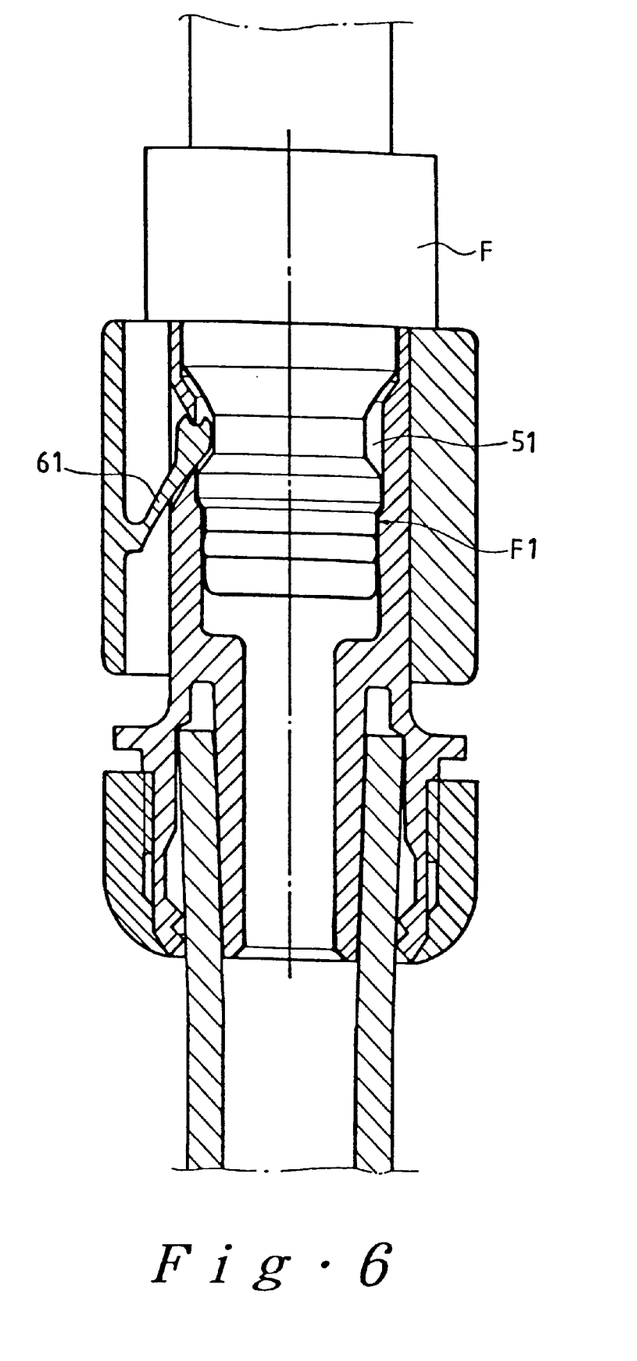
FIG. 6 Shows another schematic view illustrating the action by which the first preferred embodiment and the tubular body of the present invention are engaged.

As shown in FIG. 5, a pipe "D" is fastened with the connection portion 54 of the main body 5 such that the pipe "D" is in communication with the channel 51 of the main body 5. As the rotary body 7 is rotated upward, the connection portion 54 of the main body 5 is securely engaged with the opening 72 of the rotary body 7. Thereafter, another joint "F", which is fastened with another pipe "E", is inserted into the channel 51 of the main body 5 such that one end of the joint "F" forces the elastic piece 61 to move downward, thereby actuating the sleeve 6 to slide downward until such time when the bottom end of the elastic piece 61 is stopped by the arresting edge 52. In the meantime, the retaining portion 611 is located in the bottom of the retaining hole 551. In view of the elastic piece 61 which is obliquely located, the inclined portion of the elastic piece 61 is pressed against by the inner wall of the indentation 55 when the sleeve 6 is actuated to slide downward. As a result, the retaining portion 611 is retracted to enable the joint "F" to enter. As the recess "F1" of the joint "F" is opposite in location to the elastic piece 61, the elastic piece 61 is relieved of the pushing force exerting thereon, thereby enabling the elastic piece 61 to return to its original position. As a result, the retaining portion 611 is retained in the recess "F1" of the joint "F", as shown in FIG. 6.

Figure 7:
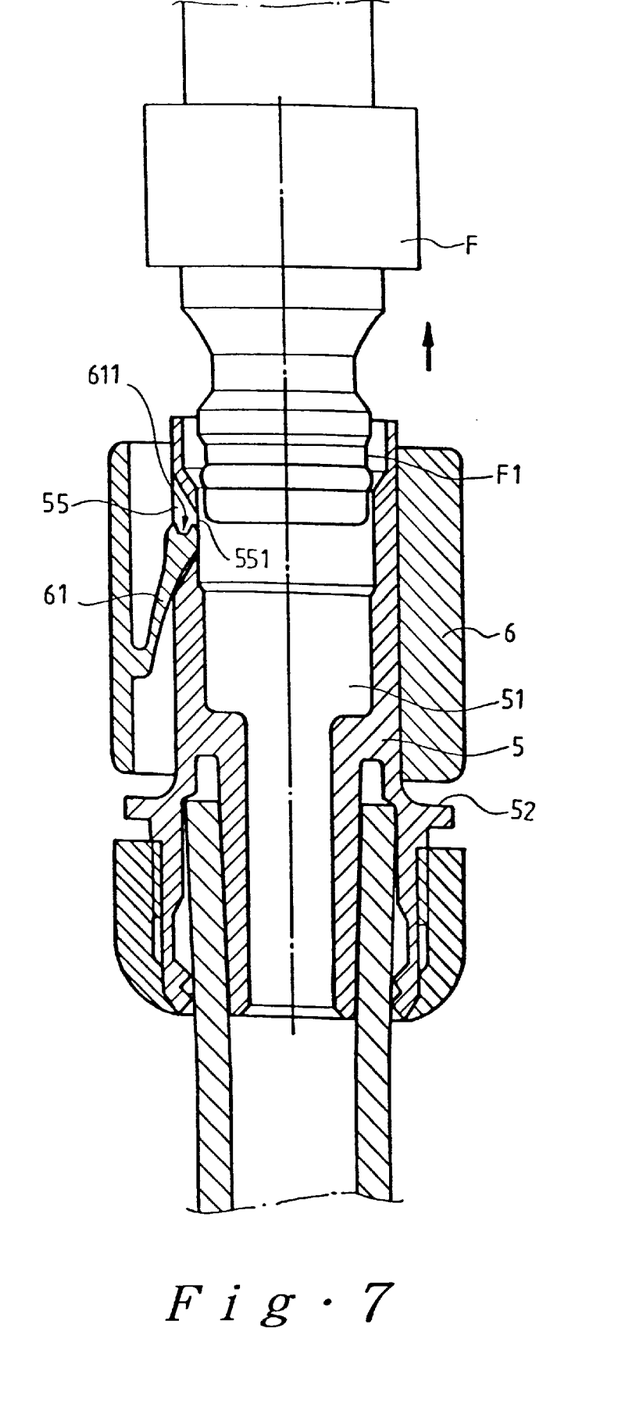
FIG. 7 Shows a schematic view illustrating the action by which the tubular body is disengaged and extracted according to the first preferred embodiment of the present invention.

Now referring to FIG. 7, the joint "F" can be disengaged with the channel 51 by pushing the sleeve 6 to move downward until such time when the bottom end of the elastic piece 61 of the sleeve 6 is stopped by the arresting edge 52 of the main body 5. In the meantime, the retaining portion 611 is located at the bottom of the retaining hole 551, whereas the inclined portion of the elastic piece 61 is pressed against by the inner wall of the indentation 55 at such time when the sleeve 6 is actuated to slide downward. As a result, the retaining portion 611 is retracted such that the recess "F1" of the joint "F" is relieved of the retaining force exerting on the recess "F1" by the retaining portion 611. The joint "F" is therefore disengaged with the channel 51 of the main body 5 of the fast joint of the present invention. It must be noted here that the locating rib 62 of the sleeve 6 serves to prevent the sleeve 6 from swaying at the time when the sleeve 6 is in motion. In addition, the elastic piece 61 of the sleeve 6 is made integrally with the sleeve 6.

Figure 8:
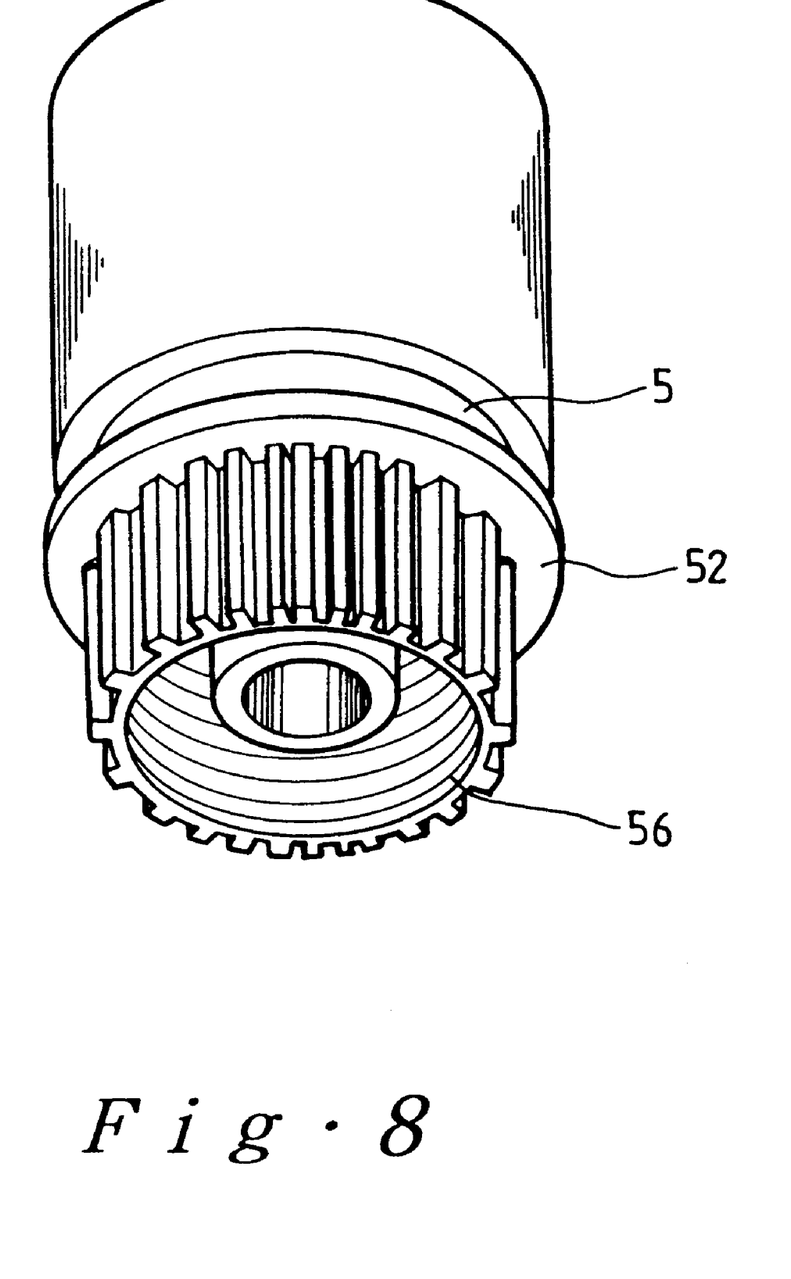
FIG. 8 Shows a perspective view of a second preferred embodiment of the present invention.
Figure 9:
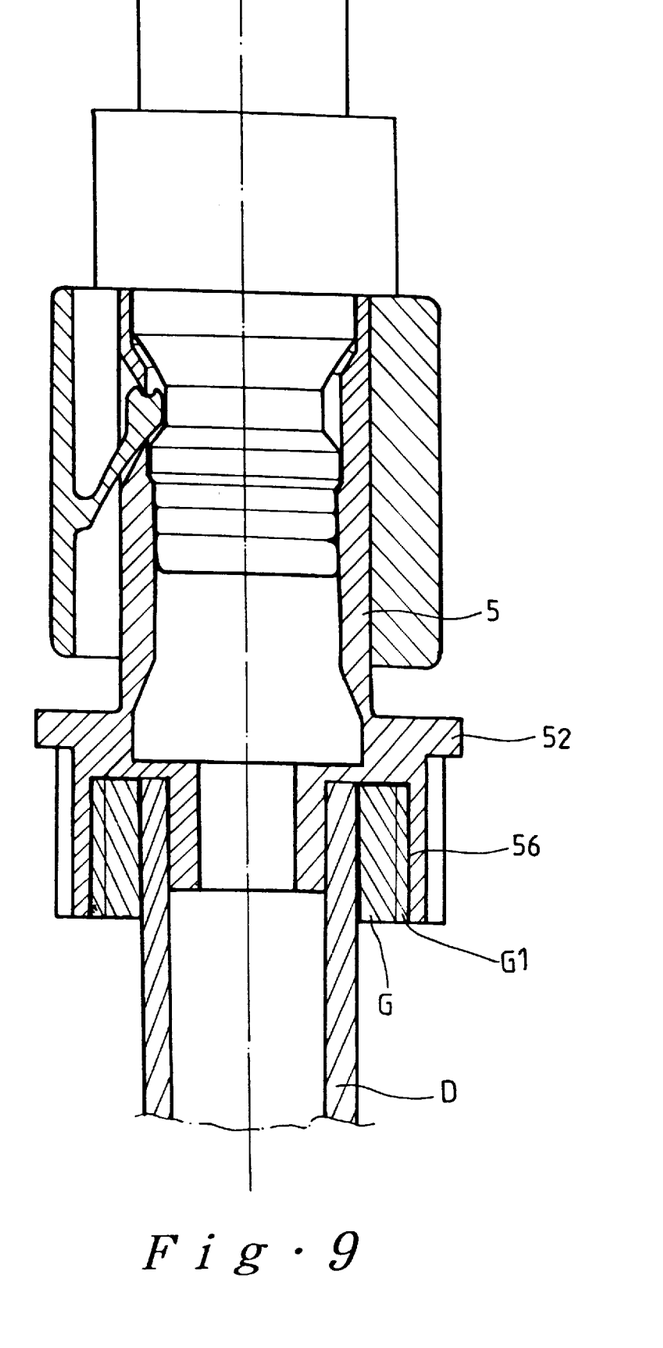
FIG. 9 is a sectional schematic view showing the engagement of the second preferred embodiment with the tubular body of the present invention.

As shown in FIGS. 8 and 9, the arresting edge 52 of the main body 5 is provided with an inner threaded section 56. The opposite end of the pipe "D" is fastened with a connection head G having outer threads G1 which are engaged with the inner threaded section 56 of the main body 5. As a result, the pipe "D" is fastened with the main body 5.

Figure 10:
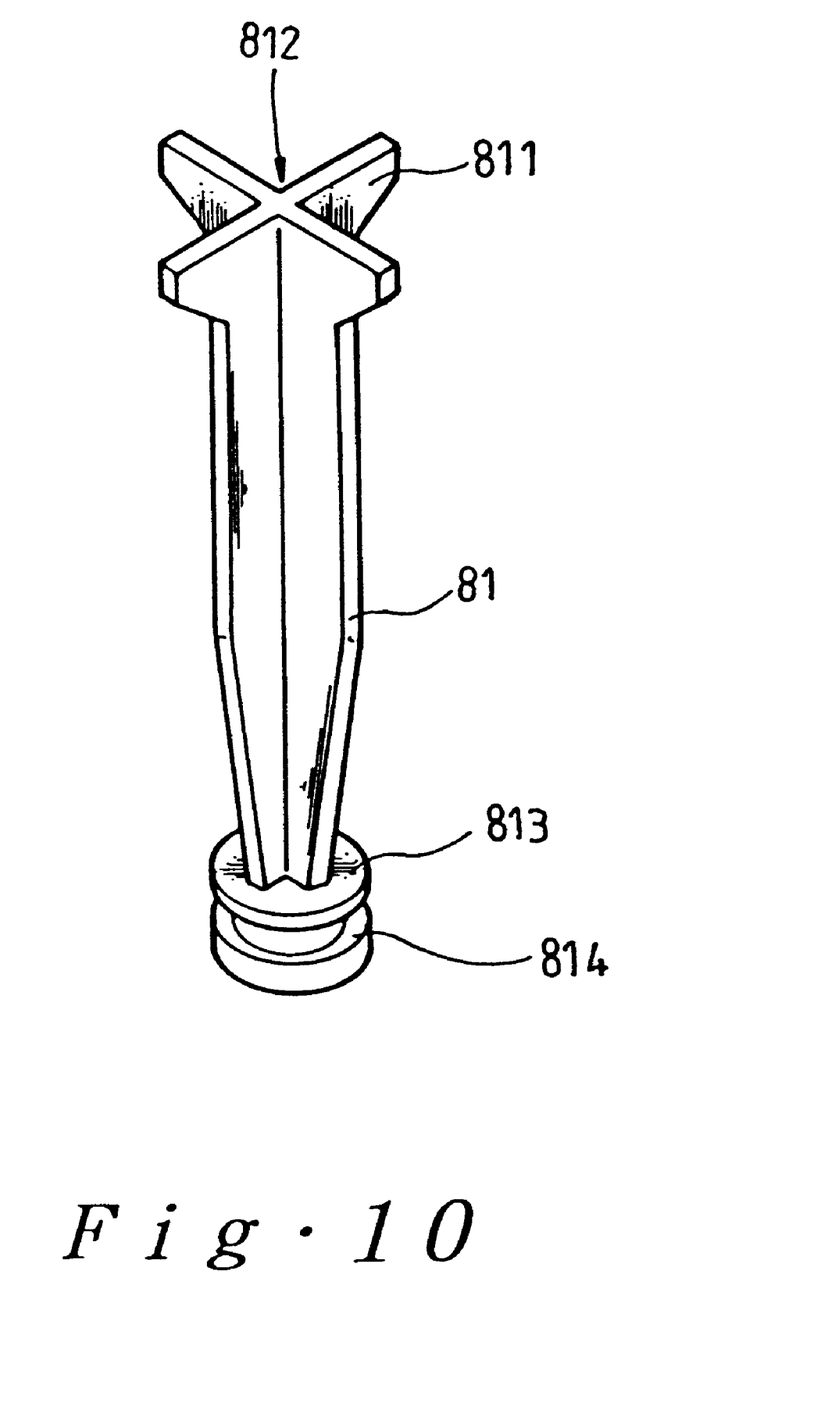
FIG. 10 Shows a perspective view of a movable valve of a third preferred embodiment of the present invention.
Figure 11:
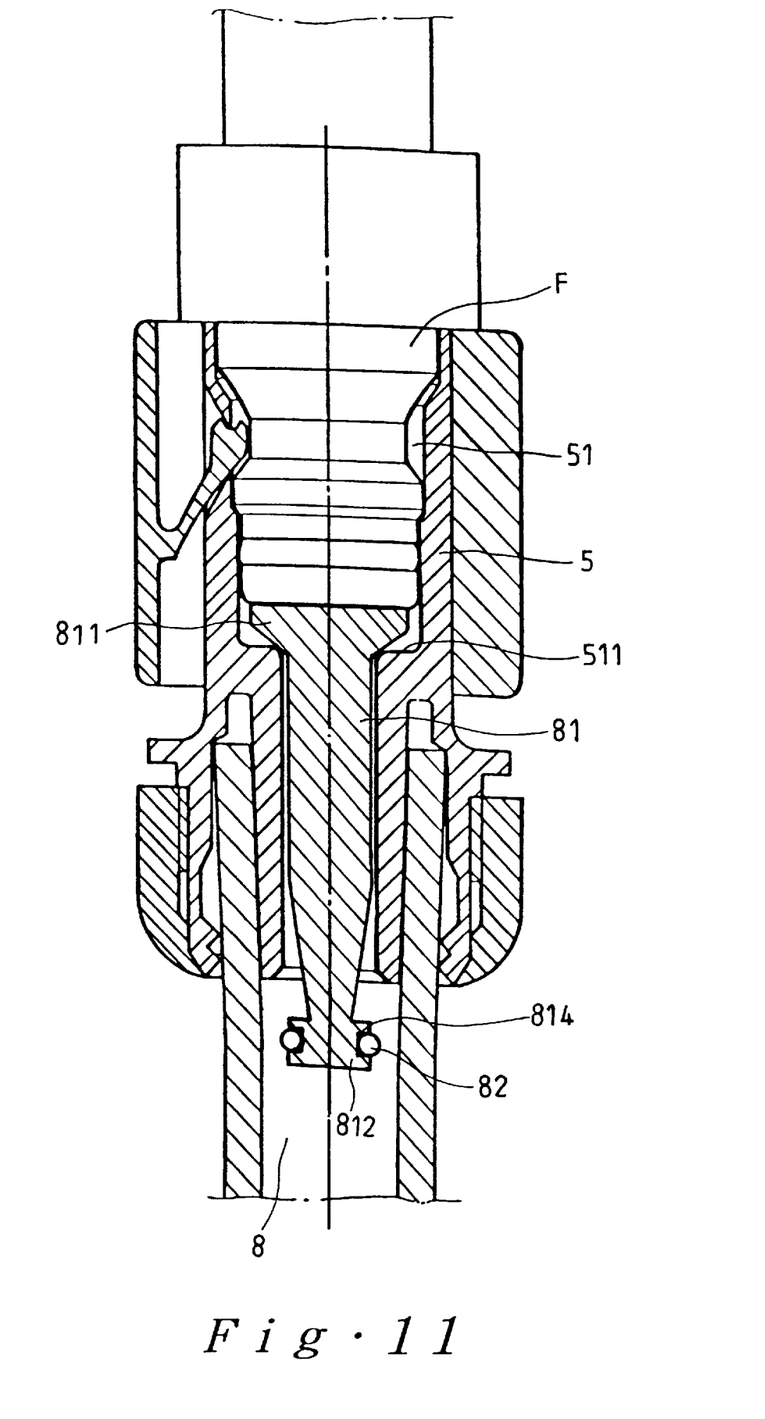
FIG. 11 Shows a schematic view of the third preferred embodiment of the present invention at work.
Figure 12:
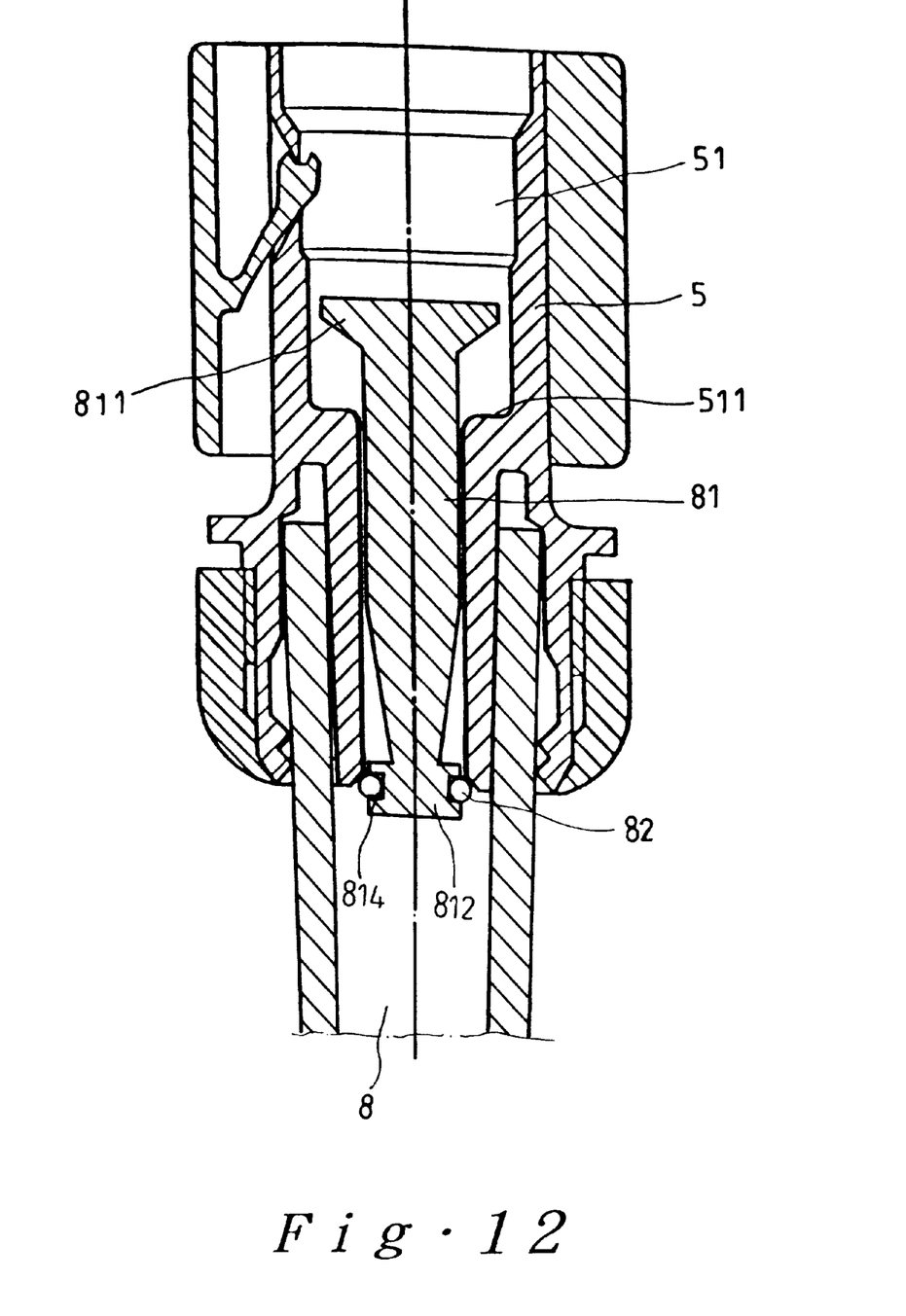
FIG. 12 Shows another schematic view of the third preferred embodiment of the present invention at work.

As shown in FIGS. 10 and 11, the main body 5 of the present invention is provided with a movable valve 8. The channel 51 of the main body 5 is provided with a stepped hole 511 in which a movable rod 81 of the movable valve 8 is located. The movable rod 81 has a large end 811 which is retained by the stepped hole 511. The movable rod 81 is provided with a water discharge hole 812. The movable rod 81 has a small end 813 which is put through the stepped hole 511 and is provided with a circular slot 814 for locating a leakproof ring 82. When the joint F is located in the channel 51 of the main body 5, the movable rod 81 is pushed by the joint F to move downward such that the large end 811 is retained in the stepped hole 511 for fastening the movable rod 81. In the meantime, the water flows out of the water discharge hole 812 into the joint F via the stepped hole 511. Now referring to FIG. 12, When the joint F is taken out of the main body 5, the movable rod 81 is forced by the water current to push upward such that the bottom end of the stepped hole 511 is pressed against by the leakproof ring 82 of the small end 813. As a result, the stepped hole 511 is completely sealed off to prevent water from entering the main body 5.

It is therefore readily apparent that the fast pipe joint of the present invention is relatively simple in construction, and that the fastjoint of the present invention is relatively cost-effective, and further that the rejection rate of the fast joint of the present invention can be thus reduced significantly. In view of the fact that the fast joint of the present invention is devoid of a metal spring of the prior art fast joint, the fast joint of the present invention is not vulnerable to rust or fatigue.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A fast pipe joint comprising a main body, and a sleeve slidably fitted over said main body; wherein said main body comprises:

a channel extending in the direction of a longitudinal axis of said main body, an arresting edge disposed outside of said main body for limiting a maximum slidable movement of said sleeve, a plurality of indentations in an outer wall of said main body, a retaining hole connecting each indentation with said channel;

wherein said sleeve comprises:

an inclined elastic piece extending from an inner wall of said sleeve and through each of said indentations, and a retaining portion provided at an outer end of said elastic piece and engageable with a corresponding said retaining hole of said main body, further wherein said elastic piece and said retaining portion are constructed such that when said sleeve is sliding toward said arresting edge, said retaining portion is moved radially away from said retaining hole and retained in said indentation, and when said sleeve is sliding away from said arresting edge, said retaining portion is moved radially inwardly of said retaining hole.

2. The fast pipe joint as defined in claim 1, wherein said elastic pieces of said sleeve are provided therebetween with a locating rib.

3. The fast pipe joint as defined in claim 1, wherein said elastic piece is provided at a top end thereof with a retaining portion engageable with said retaining hole of said main body.

4. The fast pipe joint as defined in claim 1, wherein said indentations are three in number and are equidistantly arranged in the outer wall of said main body.

5. The fast pipe joint as defined in claim 1, wherein said arresting edge of said main body is provided with an outer threaded section; wherein said main body is provided with a small end capable of being inserted into a tubular body, and wherein said main body has an outer threaded section provided with a rotary body.

6. The fast pipe joint as defined in claim 1, wherein said arresting edge of said main body is provided with an outer threaded section engageable with a threaded section of a connection head of a tubular body (pipe).

7. The fast pipe joint as defined in claim 1, wherein said channel of said main body is provided with a movable valve.

8. The fast pipe joint as defined in claim 7, wherein said channel of said main body is provided with a stepped hole; and wherein said movable valve has a movable rod which is located in said stepped hole.

9. The fast pipe joint as defined in claim 8, wherein said movable rod is provided with a water discharge hole; and wherein said movable rod has a small end.

10. The fast pipe joint as defined in claim 9, wherein said small end of said movable rod is provided with a circular slot for locating a leakproof ring.

11. The fast pipe joint as defined in claim 1, wherein said fast pipe joint further comprises a connecting portion connected to a pipe to be connected said fast pipe joint, said connecting portion comprising:

a main pipe portion to be tightly received by said channel of said main body; and a recess portion on an outer wall of said main pipe portion, said recess portion being structured to receive said retaining portion of said elastic piece when said sleeve is sliding away from said arresting edge.

* * * * *